US008554479B2

(12) United States Patent
Fiedler et al.

(10) Patent No.: US 8,554,479 B2
(45) Date of Patent: Oct. 8, 2013

(54) NAVIGATION SYSTEM AND METHOD FOR SUPPORTING DESTINATION INPUT IN A NAVIGATION SYSTEM

(75) Inventors: Marco Fiedler, Duderstadtt (DE); Stefan Lueer, Hildesheim (DE); Henry Brandes, Woelpinghausen (DE)

(73) Assignee: Robert Bosch GmbH, Stuttgart (DE)

( * ) Notice: Subject to any disclaimer, the term of this patent is extended or adjusted under 35 U.S.C. 154(b) by 1636 days.

(21) Appl. No.: 10/556,293

(22) PCT Filed: Jan. 28, 2004

(86) PCT No.: PCT/EP2004/050048
§ 371 (c)(1),
(2), (4) Date: Dec. 12, 2006

(87) PCT Pub. No.: WO2004/099720
PCT Pub. Date: Nov. 18, 2004

(65) Prior Publication Data
US 2007/0162220 A1 Jul. 12, 2007

(30) Foreign Application Priority Data
May 9, 2003 (DE) .................. 103 20 753

(51) Int. Cl.
*G01C 21/00* (2006.01)
*G01C 21/36* (2006.01)
*G08G 1/0969* (2006.01)
*G01C 21/34* (2006.01)

(52) U.S. Cl.
USPC ........... 701/538; 701/426; 701/430; 701/487; 701/533; 701/540

(58) Field of Classification Search
USPC ................. 340/995.23; 701/201, 526, 430, 701/487, 533, 538, 540
See application file for complete search history.

(56) References Cited

U.S. PATENT DOCUMENTS

| 5,774,828 | A  | * | 6/1998  | Brunts et al. ............ 701/428 |
| 5,964,821 | A  | * | 10/1999 | Brunts et al. ............ 701/487 |
| 8,428,874 | B2 | * | 4/2013  | Park et al. ............... 701/438 |
| 2002/0169547 | A1 | * | 11/2002 | Harada ................... 701/211 |
| 2002/0183924 | A1 | * | 12/2002 | Yokota ................... 701/209 |
| 2003/0036848 | A1 | * | 2/2003  | Sheha et al. ............ 701/209 |

(Continued)

FOREIGN PATENT DOCUMENTS

| DE | 196 11 915 | 10/1997 |
| DE | 101 49 352 | 2/2003 |
| FR | 2 760 282 | 9/1998 |

*Primary Examiner* — Khoi Tran
*Assistant Examiner* — Dale Moyer
(74) *Attorney, Agent, or Firm* — Kenyon & Kenyon LLP

(57) ABSTRACT

A possibility for simplifying the inputting of the destination in a motor vehicle navigation system by providing the user with useful additional items of information for the specification of ambiguous destination indications. Such a navigation system includes means for destination input, a navigation module for route planning, and means for displaying information, in particular indications of location, additional items of information concerning the indications of location, and route information, the means for destination input supporting a hierarchical, interactive inputting of the destination, by providing the user, in the case of ambiguous textual destination indications, with a choice of destination alternatives, including additional items of specifying information, until an unambiguous destination indication is made. The textual destination indications are stored together with corresponding geographic coordinates. The geographic coordinates are used for the determination of the additional items of information for the specification of destination alternatives.

6 Claims, 1 Drawing Sheet

(56) References Cited

U.S. PATENT DOCUMENTS

| | | | |
|---|---|---|---|
| 2005/0107949 A1* | 5/2005 | Yokota | 701/209 |
| 2005/0182559 A1* | 8/2005 | Listle et al. | 701/200 |
| 2006/0229807 A1* | 10/2006 | Sheha et al. | 701/209 |
| 2007/0050128 A1* | 3/2007 | Lee et al. | 701/200 |
| 2007/0192022 A1* | 8/2007 | Lueer et al. | 701/200 |

* cited by examiner

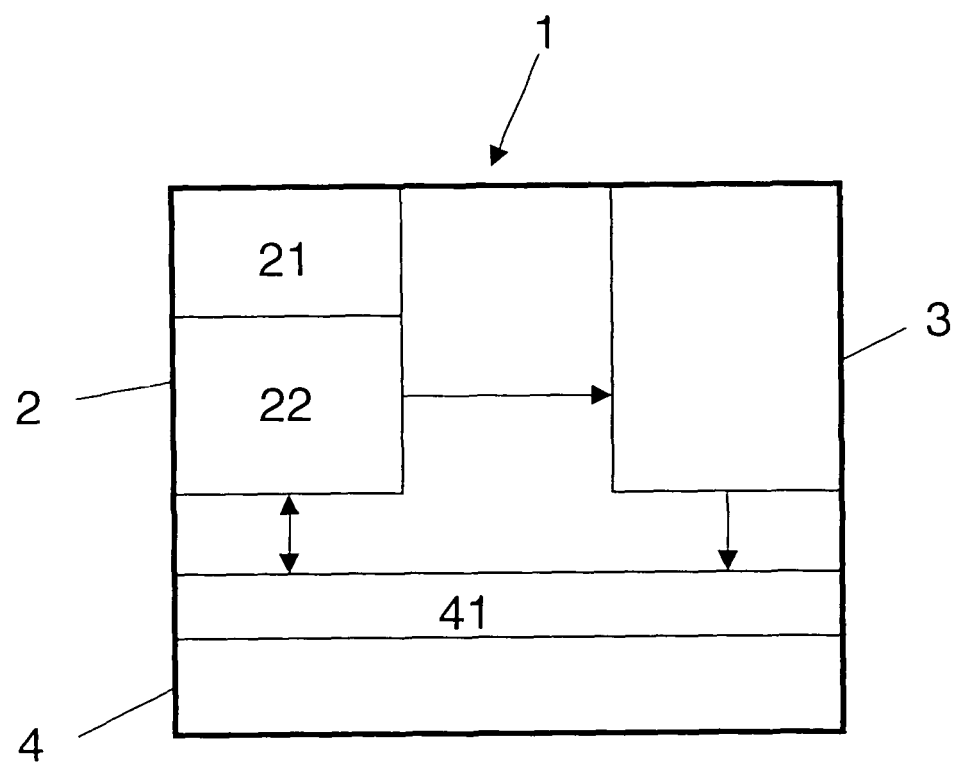

NAVIGATION SYSTEM AND METHOD FOR SUPPORTING DESTINATION INPUT IN A NAVIGATION SYSTEM

FIELD OF THE INVENTION

The present invention relates to a navigation system for a motor vehicle, having means for inputting a destination, having a navigation module for route planning, and having means for displaying information, in particular location indications (position data), additional information relating to location indications, and information concerning the route. The means for inputting the destination are designed so as to support a hierarchical, interactive destination inputting, by providing the user, in the case of ambiguous textual indications of the destination, with the option of choosing between destination alternatives, containing more specific additional information, until an unambiguous destination has been indicated. In addition, the present invention relates to a method for supporting the inputting of the destination in such a navigation system, in which in at least one query level of the destination input, the destination alternatives are specified through additional textual information.

BACKGROUND INFORMATION

A navigation system known from practice is provided with a display that is used not only to display route information, but also to support the hierarchical inputting of the destination. Thus, when the navigation system is called up the user is first offered a first list from which the type of destination input can be selected. At this point, the user can for example indicate whether the desired destination is a destination that is already known to the navigation system and is stored in a memory. In this case, a second list is then displayed that contains the stored destinations, from which the user can simply select the desired destination. If the user wishes to travel to a destination that is not known to the navigation system, he can for example select the destination type "CITY" from the first list. He will then be prompted to textually enter the desired city name. Subsequently, from a third list he can select how the destination is to be further specified. At this point, the user can for example choose between the inputting of an address or a type of destination such as restaurant, hospital, or sightseeing location. If address input is selected, the user is first prompted to textually enter the desired street name, and depending on the circumstances he may then be further prompted to enter a house number. If one of the categories RESTAURANT, HOSPITAL, or SIGHTSEEING is selected, a corresponding list is displayed, from which the user can then select the desired destination.

If the user has selected a list entry that is not unambiguous, for example because in the city in question there are several restaurants having the same name, this ambiguity must be resolved in a further input step before the navigation module can carry out a route planning. For this purpose, the user is offered a list of the destination alternatives, with additional specifying information if such information is available. In the case of the restaurants having the same name, as a rule the part of the city in which the restaurant in question is located, or its address, is displayed. However, in practice it has turned out that these textual indications of location often do not provide any real help in making a decision in inputting the destination, especially for users who are not familiar with the area.

SUMMARY OF THE INVENTION

The present invention provides a possibility for simplifying the inputting of the destination in a navigation system, by providing the user with useful additional information for making ambiguous destination indications more specific.

According to the present invention, this is achieved in that the textual destination indications are stored together with corresponding geographic coordinates, and that these geographic coordinates are used to determine the additional items of information for the specification of destination alternatives. In particular, in at least one query level of the destination inputting the destination alternatives are specified by additional items of geographic information. These are additional items of information that are determined on the basis of the geographic coordinates of the indicated destination, for example with the aid of the stored map information, such as for example the current distance from and/or direction towards the respective destination, or a map segment showing one or more destination alternatives.

According to the present invention, it has been recognized that in the use of a navigation system it is often easier to identify the desired destination on the basis of geographic information than on the basis of textual indications. For this reason, it is provided, in the context of a hierarchical destination inputting, to supplement the textual input with geographic information, and, if necessary, also to permit other types of inputs, such as for example a map input, in which the destination is identified on a displayed map with the aid of a cursor.

In principle, there are various possibilities for realizing the navigation system according to the present invention or the method according to the present invention for supporting the inputting of the destination. In particular, as already mentioned, there are various types of additional geographic information that can be determined on the basis of the geographic coordinates of the indicated destinations, and can be made available to the user. For the differentiation of point destinations, such as for example restaurants having the same name, distance and directional indications are particularly suitable, as is the representation of the corresponding map segments, on the basis of which even a user unfamiliar with the area can orient himself. However, information concerning, for example, traffic conditions or the available parking at the respective destination can also be helpful.

In an advantageous construction of the present invention, in order to resolve ambiguity the user can select the type of additional information through which the individual destination alternatives are to be specified. This variant offers the user the possibility to directly use the criteria that are essential for him, or the information known to him, for the identification of the desired destination. For this purpose, the navigation system, or its destination input means, can be designed in such a way that in the case of an ambiguous textual destination indication the user is first offered a list of types of information, such as for example address, distance/direction, map segment, brief description, etc., from which he must then select the type of information that would be most useful to him, before a list of the destination alternatives is displayed along with the corresponding additional information. However, in the case of ambiguous textual destination inputs, a list of the destination alternatives with additional information can for example also be displayed immediately, comprising the option for selecting and displaying further additional information.

BRIEF DESCRIPTION OF THE DRAWINGS

The FIGURE shows the individual components of a navigation system for a motor vehicle in a schematic diagram.

DETAILED DESCRIPTION

Navigation system 1, shown in the FIGURE, includes means 2 for inputting a destination, a navigation module 3 for route planning, and means 4 for displaying information, in particular for displaying location indications, additional information concerning the location indications, and route information. Means 2 for destination inputting comprise operating elements 21, such as for example a keyboard, rotating knobs and pushbuttons, etc., with the aid of which textual destination indications can be made and destination alternatives can be selected. In addition, the means 2 for destination inputting include an evaluation unit 22 that evaluates the inputs of the user and carries out a hierarchical querying for determining the destination, in case the desired destination is not sufficiently determined by the destination indications that have been made. In the case of ambiguous textual destination indications, evaluation unit 22 provides the user with destination alternatives from which he can choose, together with additional specifying information, until an unambiguous destination indication is made. Subsequently, evaluation unit 22 communicates the result of the hierarchical query to navigation module 3, so that navigation module 3 can start the route planning. Information display means 4 includes a display 41, but can also include acoustic reproduction means. In the context of the interactive destination inputting, the lists with the alternative selections of the individual query levels are displayed on display 41, so that display 41 also supports the interactive querying for determining the destination.

According to the present invention, the textual destination indications are stored together with the corresponding geographic coordinates. In the case of ambiguous textual destination indications, these geographic coordinates are used to determine additional items of information that are used to further specify the individual destination alternatives.

In the exemplary embodiment described here, the user may wish to travel to the restaurant "Zum roten Ochsen" ("At The Red Ox") in Heidelberg, without knowing its exact address. Upon calling up the navigation system, he selects input type "CITY" and is thereupon prompted to make a textual input of the name of the location. After inputting the name "HEIDELBERG" he is prompted to further specify the desired destination by indicating an address or choosing a type of destination. Because the user does not know the address of the restaurant "Zum roten Ochsen," he chooses destination type "RESTAURANT." He is thereupon shown a list of restaurants containing three identical entries "Roter Ochse" ("Red Ox"). Each of these identical list entries has unambiguous geographic coordinates, which as a rule are not displayed but are used to determine additional information for specifying or identifying the individual destination alternatives.

In particular for the user who is not familiar with the area, directional indications and indications of the current distance from each destination often prove to be very useful in the identification of the desired destination. The displaying of one or more map segments on which the destination alternatives are marked is also helpful. The desired destination can here be selected for example with the aid of a cursor.

However, in principle address indications, a short description, distinguishing features, or the like, can also be used as additional items of information for resolving ambiguity.

The additional items of information can be displayed together with the identical list entries in the restaurant list. In this case, the geographic coordinates are used to resolve ambiguity without having to prompt the user to make another interaction. In this way, an input step for the user can be omitted.

In the exemplary embodiment described here, however, the user is first shown a list from which he can select the type of additional information through which the destination alternatives are to be specified. The user decides in favor of a map representation as an aid to orientation. If the user now selects one of the three identical entries "Roter Ochse," the geographic coordinates stored with this entry are used to identify the location indication and to display the corresponding map segment. The map segments can inform the user that two of the three restaurants are situated in downtown Heidelberg, while the third "Roter Ochse" is situated in a suburb in the direction of the Bergstrasse. From this information, the user can conclude that the third locale is the one he is looking for.

What is claimed is:

1. A navigation system for a motor vehicle, comprising:
  a navigation module for route planning;
  a display arrangement configured to display information including textual indications of location, additional items of information concerning the locations indicated by the textual indications of location, the additional items of information corresponding to respective destinations within the locations, each destination being assigned respective geographic coordinates, and the display arrangement being further configured to display route information;
  an input arrangement configured to receive a hierarchical, interactive destination input by, in conjunction with the display arrangement and conditional upon a selecting of an ambiguous textual indication of location by a user, which ambiguous textual indication identifies a plurality of destination alternatives, each of which is displayed with the same name:
    initially displaying the plurality of destination alternatives identified by the ambiguous textual indication as a list, without displaying the additional items of information,
    providing the user with a choice between a plurality of categories of additional information,
    receiving the choice from the user, and
    subsequently displaying, in response to a user selection of a particular one of the plurality of destination alternatives, those additional items of information that correspond to the selected destination alternative and which belong to a category specified by the choice; and
  a memory in which each destination alternative is stored together with corresponding geographic coordinates, and the geographic coordinates of the selected destination alternative are used to determine the additional items of information that correspond to the selected destination alternative.

2. The navigation system according to claim 1, wherein the additional items of information that correspond to the selected destination alternative include at least one of a current distance from the selected destination alternative and a direction to the selected destination alternative.

3. The navigation system according to claim 1, wherein the displaying the additional items of information that correspond to the selected destination alternative includes a displaying of at least one map segment in which the selected destination alternative is located.

4. A method for supporting an inputting of a destination in a navigation system for a motor vehicle, the navigation system including an arrangement for destination input, a navigation module for route planning, and an arrangement for displaying information including textual indications of location, additional items of information concerning the locations indicated by the textual indications of location, the additional items of information corresponding to respective destinations within the locations, each destination being assigned respective geographic coordinates, and for displaying route information, the method comprising:

performing, by an evaluation unit, the destination input in a hierarchical and interactive fashion by, conditional upon a selecting of an ambiguous textual indication of location by a user, which ambiguous textual indication identifies a plurality of destination alternatives, each of which is displayed with the same name:

initially displaying the plurality of destination alternatives identified by the ambiguous textual indication as a list, without displaying the additional items of information, providing the user with a choice between a plurality of categories of additional information, receiving the choice from the user, and subsequently displaying, in response to a user selection of a particular one of the plurality of destination alternatives, those additional items of information that correspond to the selected destination alternative and which belong to a category specified by the choice, wherein in at least one query level of the destination inputting, the displaying the additional items of information that correspond to the selected destination alternative includes displaying additional items of textual information including geographic information, determined on the basis of geographic coordinates of the selected destination alternative.

5. The method according to claim 4, wherein the additional items of information that correspond to the selected destination alternative include at least one of a current distance from the selected destination alternative and a direction to the selected destination alternative.

6. The method according to claim 4, wherein the displaying the additional items of information that correspond to the selected destination alternative includes a displaying of at least one map segment in which the selected destination alternative is located.

* * * * *

UNITED STATES PATENT AND TRADEMARK OFFICE
CERTIFICATE OF CORRECTION

PATENT NO.       : 8,554,479 B2                                         Page 1 of 1
APPLICATION NO.  : 10/556293
DATED            : October 8, 2013
INVENTOR(S)      : Fiedler et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2148 days.

Signed and Sealed this

Fifteenth Day of September, 2015

Michelle K. Lee
*Director of the United States Patent and Trademark Office*